United States Patent [19]

Hiyoshi et al.

[11] E Re. 30,736

[45] Reissued Sep. 8, 1981

[54] TONE WAVE GENERATOR IN ELECTRONIC MUSICAL INSTRUMENT

[75] Inventors: Teruo Hiyoshi; Akira Nakada, both of Hamamatsu; Tsutomu Suzuki, Shizuoka; Eiichiro Aoki; Takatoshi Okumura, both of Hamamatsu, all of Japan

[73] Assignee: Nippon Gakki Seizo Kabushiki Kaisha, Hamamatsu, Japan

[21] Appl. No.: 154,994

[22] Filed: May 30, 1980

Related U.S. Patent Documents

Reissue of:

[64] Patent No.: 4,179,972
Issued: Dec. 25, 1979
Appl. No.: 841,716
Filed: Oct. 13, 1977

[30] Foreign Application Priority Data

Oct. 18, 1976 [JP] Japan ..... 51-124529

[51] Int. Cl.[3] ..... G10H 7/00

[52] U.S. Cl. ..... 84/1.11; 84/1.01; 84/1.17; 84/1.19; 84/1.24

[58] Field of Search ..... 84/1.01, 1.03, 1.11, 84/1.17, 1.19, 1.24, DIG. 2, DIG. 9

[56] References Cited

U.S. PATENT DOCUMENTS

| | | | |
|---|---|---|---|
| 3,610,800 | 10/1971 | Deutsch | 84/1.01 |
| 3,697,661 | 10/1972 | Deutsch | 84/1.01 |
| 3,910,150 | 10/1975 | Deutsch et al. | 84/1.03 |
| 3,929,051 | 12/1975 | Moore | 84/1.17 |
| 4,011,784 | 3/1977 | Fukui | 84/1.01 |
| 4,046,047 | 9/1977 | Roberts | 84/1.01 |
| 4,052,924 | 10/1977 | Deutsch et al. | 84/1.24 |
| 4,080,862 | 3/1978 | Hiyoshi et al. | 84/1.24 |
| 4,114,497 | 9/1978 | Hiyoshi et al. | 84/1.17 |

*Primary Examiner*—S. J. Witkowski

[57] ABSTRACT

In an electronic musical instrument, the keys of a keyboard are divided into a plurality of groups by octaves, and a wave generator is provided with a memory for storing constants corresponding to musical tone frequencies to be generated according to the notes includes in a desired group out of the plurality of group, an accumulator for repeatedly adding the constants read out of the memory, and a bit position shifting circuit for shifting the bit position of the data produced by the accumulator according to the octave range of a note to be produced, thereby to obtain the data varying repeatedly according to the frequency of a note to be produced, and to reduce the storing capacity of the memory when compared to the number of keys.

20 Claims, 24 Drawing Figures

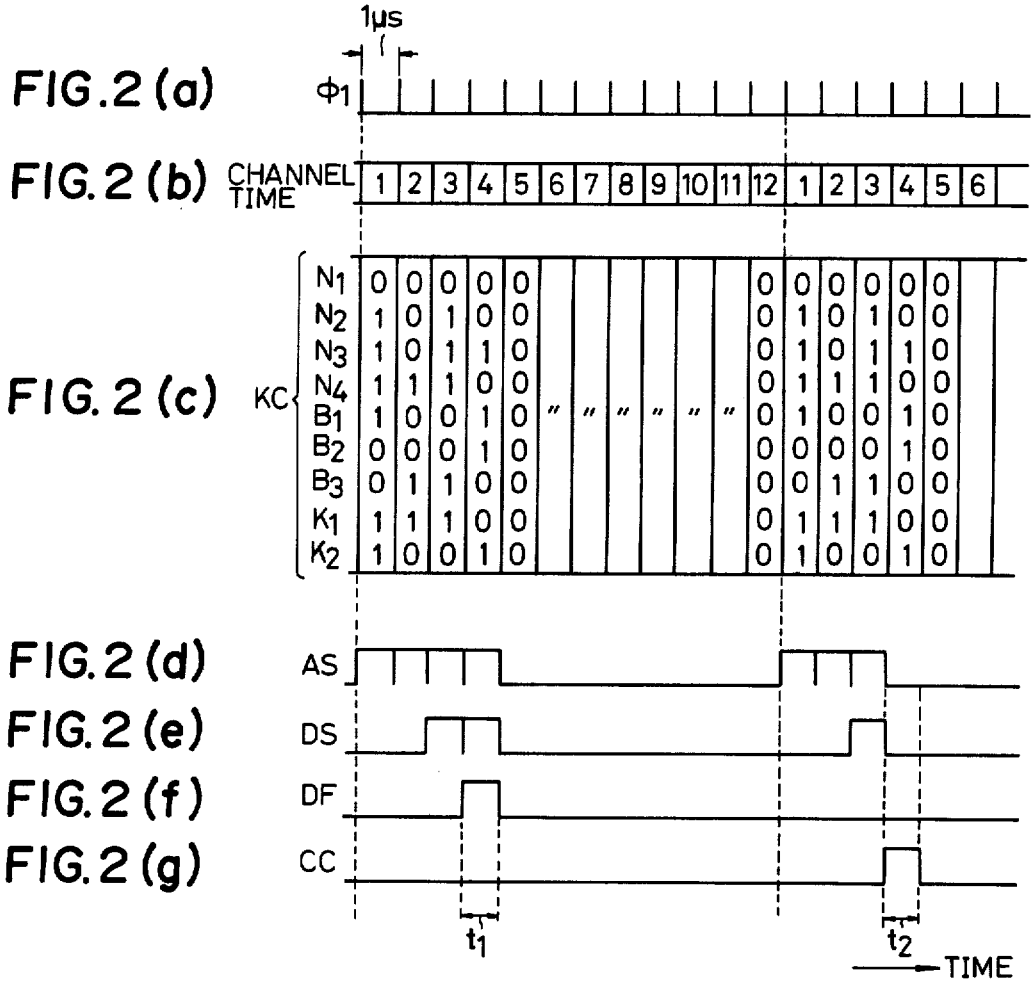
1μs
FIG.2 (a)
Φ1
FIG.2 (b)
CHANNEL TIME
1 2 3 4 5 6 7 8 9 10 11 12 1 2 3 4 5 6
FIG.2 (c)
KC
N1 0 0 0 0 0 0 0 0 0 0 0 0 0 0 0 0
N2 1 0 1 0 0 0 1 0 1 0 0
N3 1 0 1 1 0 0 1 0 1 1 0
N4 1 1 1 0 0 0 1 1 1 0 0
B1 1 0 0 1 0 〃 〃 〃 〃 〃 〃 0 1 0 0 1 0
B2 0 0 0 1 0 0 0 0 0 1 0
B3 0 1 1 0 0 0 0 1 1 0 0
K1 1 1 1 0 0 0 1 1 1 0 0
K2 1 0 0 1 0 0 1 0 0 1 0
FIG.2 (d)
AS
FIG.2 (e)
DS
FIG.2 (f)
DF
FIG.2 (g)
CC
t1
t2
TIME
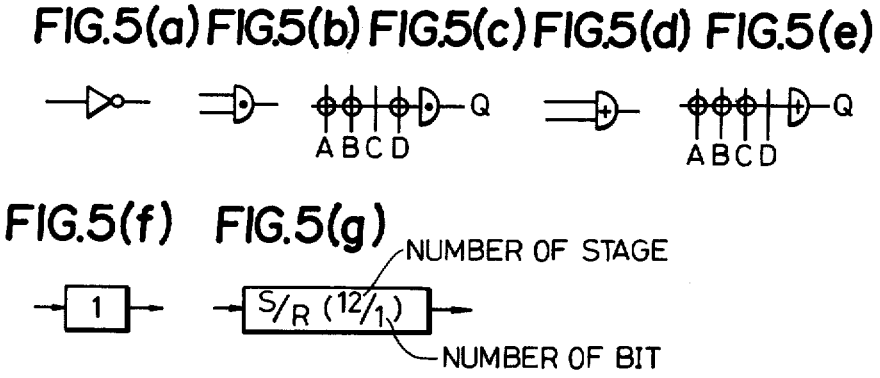
FIG.5(a) FIG.5(b) FIG.5(c) FIG.5(d) FIG.5(e)
Q
A B C D
Q
A B C D
FIG.5(f) FIG.5(g)
NUMBER OF STAGE
1
S/R (12/1)
NUMBER OF BIT

TONE WAVE GENERATOR IN ELECTRONIC MUSICAL INSTRUMENT

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to a [note] *tone* wave generator in an electronic musical instrument, in which data which varies repeatedly at the period corresponding to a desired musical tone frequency is produced and employed for reading the contents stored in a waveform memory.

Known in the art is an electronic musical instrument according to the system that in the case where the values of the sequential sample point amplitudes of a waveform stored in a waveform memory are read successively to obtain a musical tone signal or a tone source signal, a constant corresponding to the frequency of a tone to be produced is repeatedly subjected to addition, and the reading address of the waveform memory is advanced according to the numerical increase resulted from the addition. Heretofore, in the electronic musical instrument of this type, such a constant as described above is stored in a memory for each of the tones of the keyboard. Therefore, it is necessary to provide a relatively large capacity for the memory. For instance, if the number of keys is sixty-one (61), a read only memory having sixty-one (61) addresses is employed as the memory mentioned above.

Accordingly, an object of this invention is to provide a wave generator in an electronic musical instrument, in which the storing capacity of a memory adapted to store constants proportional to frequencies is reduced.

According to this invention, twelve constants proportional to the frequencies corresponding to twelve notes in one octave, for instance, are stored in a memory in advance, and out of these constants, one corresponding to a note to be produced is read out and regularly accumulated in an accumulator. The accumulation result of the accumulator is utilized as the address for reading the sequential sample point amplitude value of the waveform out of the waveform memory; however, what can be distinguished by the output itself of the accumulator is only twelve notes in one octave.

Therefore, in this invention, the bit position of the output data of the accumulator is shifted according to the information indicating the octave range of a note to be produced, and then the output data is utilized as the address in the waveform memory. More specifically, shifting the bit position of a binary data means that its value is increased to two times, four times, eight times . . . or decreased to ½ time, ¼ time, ⅛ time . . . , which means that the frequency is shifted high or low by one octave, two octaves, three octave and so on. Thus, selection of the octave range can be achieved by shifting the output but position of the accumulator.

The manner in which the foregoing object and other objects are achieved by this invention will become more apparent from the following detailed description and the appended claims when read in conjunction with the accompanying drawings, in which like parts are designated by like reference numerals or characters.

BRIEF DESCRIPTION OF THE DRAWINGS

In the accompanying drawings:

FIG. 2a–2g are timing charts for a description of the operation of a tone production assigning circuit shown in FIG. 1;

FIGS. 5a–5g are diagrams for a description of a method of illustrating various circuit elements;

FIGS. 7a–7f are timing charts for a description of a maximum tone detecting operation in a key voltage generating circuit.

DETAILED DESCRIPTION OF THE INVENTION

One preferred embodiment of this invention will be described with reference to the accompanying drawings.

Figure 1:
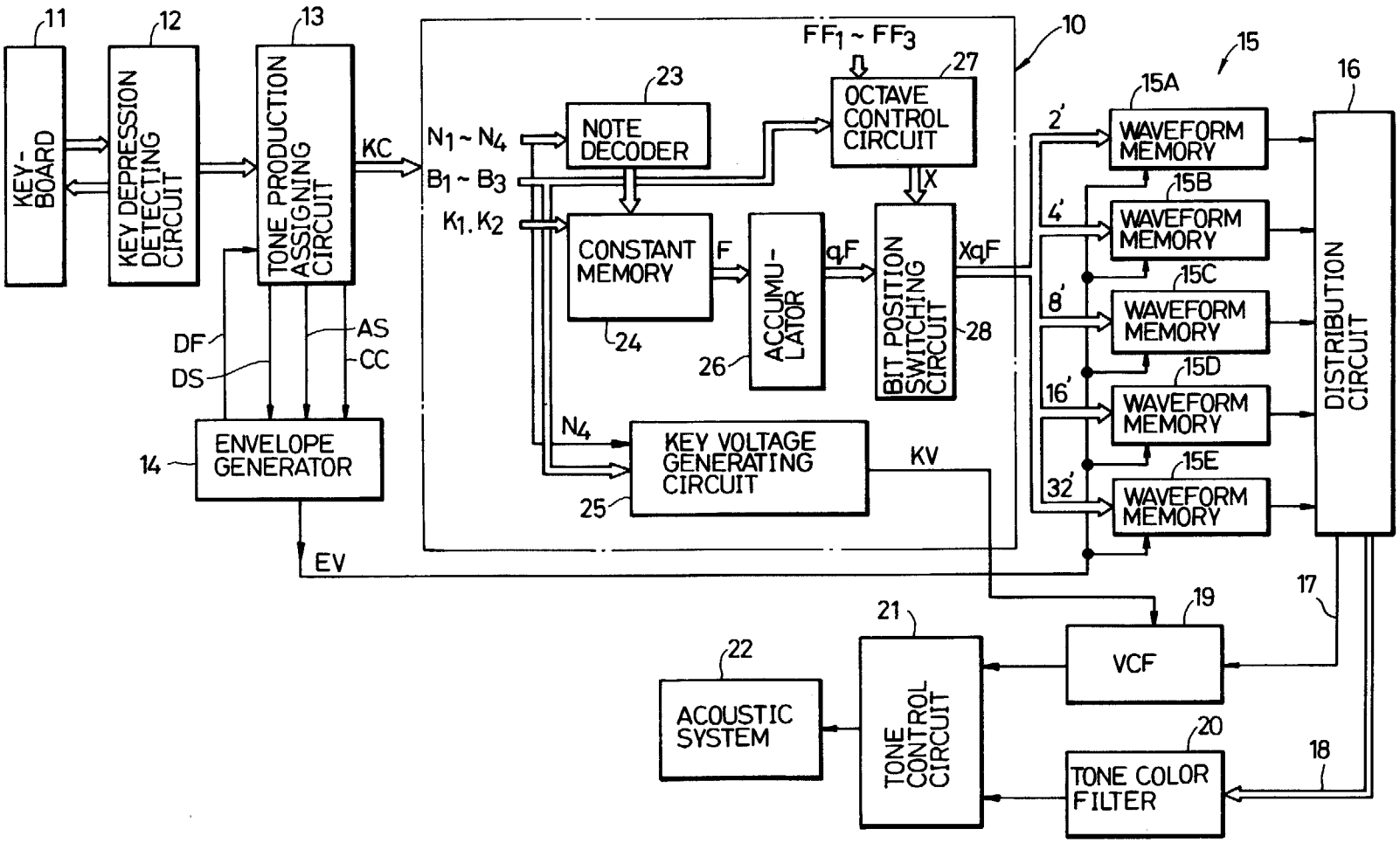
FIG. 1 is a block diagram illustrating one example of a wave generator according to this invention in association with the whole arrangement of an electronic musical instrument.

FIG. 1 illustrates one example of an electronic musical instrument employing a tone wave generator 10 according to the invention. A key depression detecting circuit 12 operates to detect the "on" or "off" operation of the key switch of each key in a keyboard 11 to output information for identifying a depressed key. A tone production assigning circuit 13 receives information identifying a depressed key from the key depression detecting circuit 12 and assigns the tone production of the key represented by the information to one of the channels which corresponds to a maximum number of simultaneous tone productions (for instance twelve tones). The tone production assigning circuit 13 has storage positions corresponding to the channels. This circuit 13 operates to store a key code KC representative of a key in a storage position corresponding to the channel to which the tone production of the key is assigned, and successively output the key codes KC stored in the channels in time-sharing manner. In order to identify the keys in the keyboard, the key code KC consists of a 2-bit keyboard code $K_1$, $K_2$ representing a kind of keyboard, a 3-bit octave code $B_1$, $B_2$, $B_3$ representing an octave range, and a 4-bit note code $N_1$, $N_2$, $N_3$, $N_4$ representing a note out of twelve notes in one octave, as indicated in Table 1.

TABLE 1

| | | Key Code KC | | | | | | | | |
|---|---|---|---|---|---|---|---|---|---|---|
| | | $K_2$ | $K_1$ | $B_3$ | $B_2$ | $B_1$ | $N_4$ | $N_3$ | $N_2$ | $N_1$ |
| Keyboard | Upper | 0 | 1 | | | | | | | |
| | Lower | 1 | 0 | | | | | | | |
| | Pedal | 1 | 1 | | | | | | | |
| Octave scale | 1st | | | 0 | 0 | 0 | | | | |
| | 2nd | | | 0 | 0 | 1 | | | | |
| | 3rd | | | 0 | 1 | 0 | | | | |
| | 4th | | | 0 | 1 | 1 | | | | |
| | 5th | | | 1 | 0 | 0 | | | | |
| | 6th | | | 1 | 0 | 1 | | | | |
| Pitch name | C# | | | | | | 0 | 0 | 0 | 0 |
| | D | | | | | | 0 | 0 | 0 | 1 |
| | D# | | | | | | 0 | 0 | 1 | 0 |

TABLE 1-continued

| | Key Code KC | | | | | | | | |
|---|---|---|---|---|---|---|---|---|---|
| | $K_2$ | $K_1$ | $B_3$ | $B_2$ | $B_1$ | $N_4$ | $N_3$ | $N_2$ | $N_1$ |
| E | | | | | | 0 | 1 | 0 | 0 |
| F | | | | | | 0 | 1 | 0 | 1 |
| F# | | | | | | 0 | 1 | 1 | 0 |
| G | | | | | | 1 | 0 | 0 | 0 |
| G# | | | | | | 1 | 0 | 0 | 1 |
| A | | | | | | 1 | 0 | 1 | 0 |
| A# | | | | | | 1 | 1 | 0 | 0 |
| B | | | | | | 1 | 1 | 0 | 1 |
| C | | | | | | 1 | 1 | 1 | 0 |

In this example, it is assumed that the key range of the keyboard 11 is from note $C_2$ to $C_7$. The octave code "000" for the first octave range is used for the lowest note $C_2$ only, and its code $B_3$–$N_1$ is "0001110". The octave code $B_3$, $B_2$, $B_1$ or "001" for the second octave range is used for tones of from $C_{2\#}$ to $C_3$. Similarly as in this case, the same octave code $B_3$, $B_2$, $B_1$ is used, with notes C# on the low pitch side through C on the high pitch side as one octave. The octave code "101" for the sixth octave range is used for notes $C_6$# through $C_7$.

In this example, in order that a plurality of tones can be produced simultaneously, the logic circuits, and the memory means are commonly used in time-sharing manner, that is, they are designed in a dynamic-logic mode. Therefore, the relationships between clock pulses controlling the operation of the instrument are very important. Shown in the part (a) of FIG. 2 are main clock pulses $\phi_1$ which are adapted to control the time sharing operations of the channels. The clock pulse signal has a period of, for instance, one microsecond ($10-^6$ second). As the number of channel is twelve, time slots, each one microsecond in time width, segregated by the main clock pulses $\phi_1$ are successively allowed to correspond to the first through twelfth channels. As shown in the part (b) of FIG. 2, the time slots will be called the first through twelfth channel times successively hereinafter. The channel times occur cyclically. Accordingly, the key codes representing the keys for which tone production has been assigned by the tone production assigning circuit 13 are outputted successively and in time sharing manner in coincidence with the times of the assigned channels. For instance, in the case where note C ($C_3$) in the second octave range of the pedal keyboard is assigned to the first channel, note G ($G_5$) in the fifth octave range of the upper keyboard is assigned to the second channel, note C ($C_6$) in the fifth octave range of the upper key-board is assigned to the third channel, note E ($E_4$) in the fourth octave range of the lower keyboard is assigned to the fourth channel, and no notes are assigned to the fifth through twelfth channel; the contents of the key codes outputted in time-sharing manner and in synchronization with the respective channel times by the tone production assigning circuit 13 are as indicated in the part (c) of FIG. 2. As is apparent from the part (c) of FIG. 2, all of the outputs of the fifth channel through the twelfth channel are "0".

The tone production assigning circuit 13 outputs in time-sharing manner and in synchronization with the channel times an attack start signal (or a key-on signal) AS representative of the fact that the tone production of the depressed key should be effected in the channel to which the tone production is assigned. Furthermore, the tone production assigning circuit 13 outputs, in time-sharing manner and in synchronization with the respective channel times, a decay start signal (or a key-off signal) DS representative of the fact that key whose tone productions is assigned to the specific channel has been released and the tone production should thereby be in a decay state. These signals AS and DS are utilized for amplitude envelope control (tone production control) of musical tones. In addition, the tone production assigning circuit 13 receives a decay finish signal DF representative of the fact that the tone production in a channel has been finished, from an envelope generator 14, and then outputs clear signal CC to clear the various storage relating to the relevant channels and to completely clear the tone production assignments according to the signal DF thus received.

If it is assumed in the part (c) of FIG. 2 that the keys assigned to the first and second channels are being depressed, the keys assigned to the third and fourth channels have been released as a result of which the tone productions of the keys are being decayed, in the fourth channel the tone production has been completed at the time slot $t_1$ whereby the decay finish signal DF is produced, and the clear signal CC is provided twelve channel times later, i.e., at the time slot $t_2$; then the various signals AS, DS, DF and CC are provided as shown in the parts (d) through (g) of FIG. 2. As the clear signal CC is produced at the time slot $t_a$, the attack start signal AS and the decay start signal are eliminated. In this case, the key code KC for the fourth channel time is also eliminated, but it is shown as it is for convenience in description.

The channels to which the various signal KC, AS, DS and CC outputted by the fine production assigning circuit 13 belong are distinguished by the channel times as shown in FIG. 2.

The key code KC outputted by the tone production assigning circuit 13 is applied to the wave generator 10, which outputs in turn variable data (address data) XqF for reading the sequential sample point amplitudes of musical tone source waveforms out of a waveform memory 15. In this example, the waveform memory 15 is so designed that tone surface waveforms of different footage are read out in a parallel mode, and memories 15A through 15E are provided in correspondence to notes of 2 foot (2'), 4 foot (4'), 8 foot (8'), 16 foot (16') and 32 foot (32') registers.

The envelope generator 14 operates to generate an envelope shape EV having attack and decay characteristics with the aid of the various signals AS, DS and CC which are applied thereto from the tone production assigning circuit 13. A amplitude envelope variable with time is given to a tone source waveform signal read out of the waveform memory 15 with the aid of this envelope shape EV, whereby the tone production is controlled.

The tone source waveform signals for the various foot registers 2' through 32' read out of the waveform memory 15 are applied to a distribution circuit 16, which distributes these signals to lines 17 and 18 suitably according to the kinds of keyboards, etc. The tone source waveform signal distributed to the line 17 is applied to a voltage control type filter 19 and is subjected to a tone color control. The tone source waveform signal distributed to the line 18 is applied to a group of tone color filters (20) and is subjected to the tone color control. The filtering characteristic of the voltage control type filter 19 is varied by a control voltage (not shown). The filtering characteristic of the group of tone color filters 20 is fixed with respect to the various tone colors. Accordingly, in the two systems tones different in quality are formed. The musical tone waveform signal subjected to tone color control is applied through a suitable tone control circuit 21 such as an expression circuit or the like to a sound system 22 where it is produced.

Figure 3:
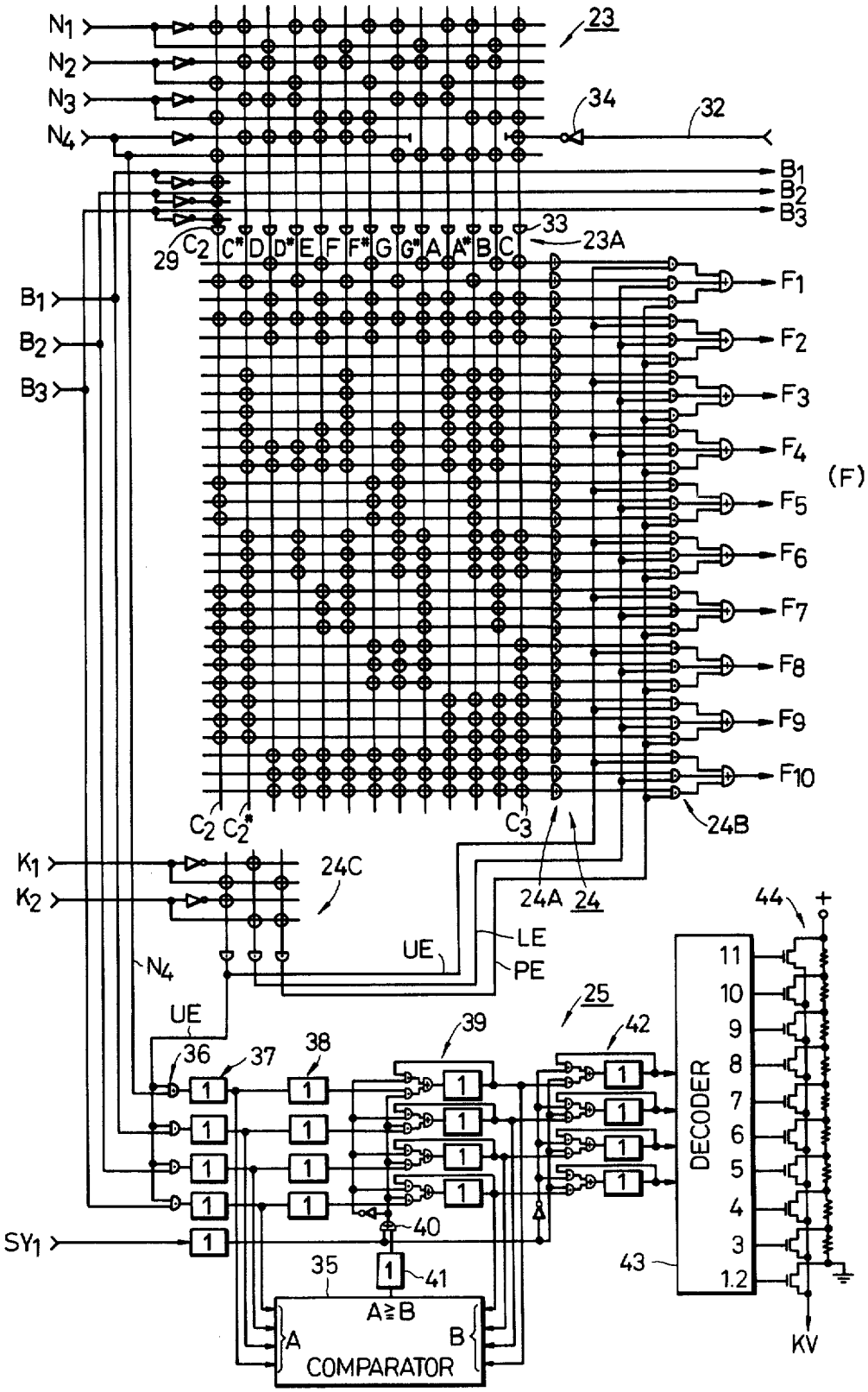
FIG. 3 and FIG. 4 are two parts of a schematic block diagram illustrating in detail the various sections of the wave generator shown in FIG. 1.
Figure 4:
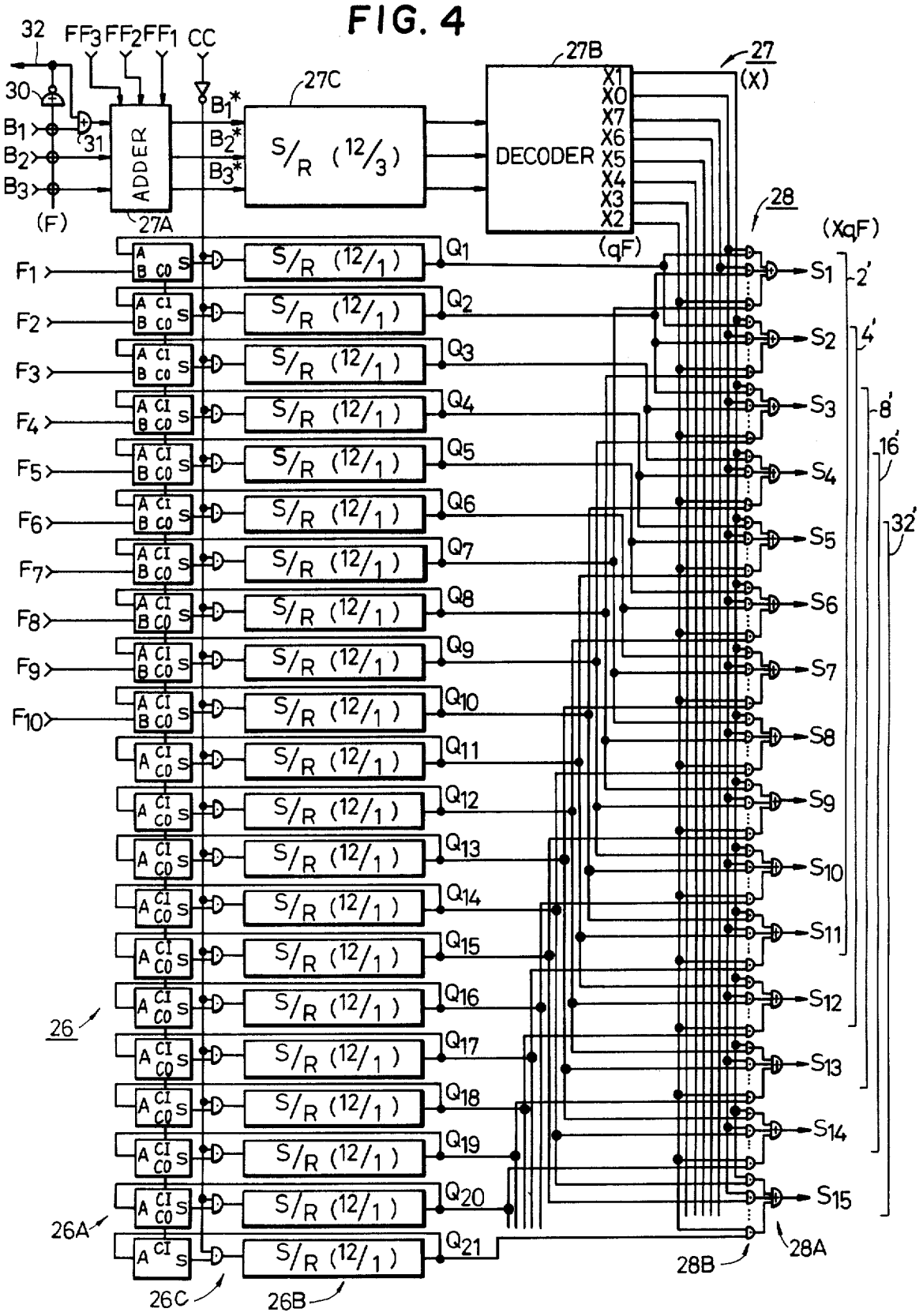

FIGS. 3 and 4 are two part of a block diagram illustrating the wave generator 10. A note decoder 23, a constant memory 24 and key voltage generating circuit 25 in the wave generator 10 are shown in FIG. 3. An accumulator 26, an octave control circuit 27 and a bit position switching circuit 28 are shown in detail in FIG. 4.

In FIGS. 3 and 4, various circuit elements are indicated in accordance with methods as shown in FIG. 5. In FIG. 5, the part (a) indicates an inverter; the parts (b) and (c), AND circuits; the parts (d) and (e), OR circuits; and the part (f) flip-flop circuit with 1-bit delay. If in the AND circuit or the OR circuit the number of inputs is relatively small, the ordinary illustrations as shown in the parts (b) and (d) are employed; but if the number of inputs is relatively large, the illustrations as shown in the parts (c) and (e) are employed. In the part (c) or (e), one input line is drawn on the input side of the circuit, and then a plurality of signal lines are intersected with the input line, and furthermore the intersections of the signal lines of the signals to be inputted to the circuit and the input line are encircled. Accordingly, in the case of the part (c) of FIG. 5, the logical expression is $Q=A\cdot B\cdot D$. In the case of the part (e), the logical expression is $Q=A+B+C$. The part (g) of FIG. 5 indicates a shift register, in which the numerator of a fraction parenthesized in the block means the number of stages of the shift register, while the denominator means the number of bits of an input data to the shift register. No shifting clock pulses are indicated for delay flip-flop circuits and shift registers; however, it should be understood that they are shifted with the aid of clock pulses $\phi$ (more particularly being two-phase clock pulses) having a period of one microsecond.

Out of the key codes KC supplied by the tone production assigning circuit 13, the note codes $N_1$ through $N_4$ is applied to the note decoder 23, as a result of which a decode output is provided on an output line corresponding to a note represented by the note codes $N_1$–$N_4$. In the constant memory 24, constant data F proportional to the frequencies of twelve notes C through B are stored in a binary system in advance. A constant data F corresponding to a note represented by the note codes $N_1$–$N_4$ is read out according to the output of the note decoder 23. In the accumulator 26, the constant data F read out of the memory 24 are repeatedly added every regular time interval T, thereby to obtain variable data qF, where "q" is a variable which increases as 1, 2, 3, 4 and so on every lapse of time interval T.

The output qF of the accumulator 26 is applied to the bit position switching circuit 28, and the binary bit position is shifted leftward or rightward according to the value of an octave switching data X provided by the octave control circuit 27. In other words, the variable data qF which varies regularly in response to the frequencies of the notes in one octave is multiplied by the octave switching data X, thereby to obtain a variable data XqF corresponding to the frequency of a relevant note in the octave range specified by the octave switching data X.

The octave switching data X is produced according to the contents of the octave code $B_1$–$B_3$. In general, the value of the data X will become capable of realizing the octave range specified by the octave code $B_1$–$B_3$; however, it can suitably change the octave range by changing the code $B_1$–$B_3$ according to the values of feet change data $FF_1$–$FF_3$. The distance of one octave corresponds to a frequency ratio 2:1. Therefore, if it is assumed that the octave range to which the notes stored in the constant memory 24 belong is the fundamental octave, when the octave range of a note to be produced is higher by n octaves then the fundamental octave, the value of X is $2^n$, and when it is lower by n octave than the fundamental octave, the value of X is $2^{-n}$. Thus, the relation in frequency between octave is of the power of 2. Therefore, the octave switching control can be achieved by the binary bit position switching circuit 28. In this example, the bit position switching circuit 28 is provided at the rear stage of the accumulator 26; however, it may be provided at the front stage of the accumulator 26 to obtain the variable data XqF similarly as in the above-described case.

The value of the constant data F stored in the constant memory 24 is determined from the frequency f of a relevant note in the fundamental octave, the number of times N of adding the same data f in one second in the accumulator 26, and the number of addresses M for one period of a waveform stored in the waveform memory 15. That is, the decimal value of the constant data F is determined by the following equation (1):

$$F=(f\cdot M)/N \tag{1}$$

The constant data f for the notes obtained from the equation (1) are converted into binary numbers, and these binary constant data F are stored in the constant memory 24 in advance.

In the variable data ZqF, the value of the variable q becomes N in one second. Therefore, the above equation (1) can be rewritten into the following equation (2):

$$XF=(Xf\cdot M)/N \tag{2}$$

Accordingly, the frequency is switched in proportion to the value of the octave switching data X. As was described above, the data X has a value of the power of 2. Therefore, the frequency Xf is switched with the power of 2 of the frequency f, and the frequency of the tone to be produced is switched on the octave basis. That is, the octave range is selected for the tone to be produced.

Accordingly, when the output data qF of the accumulator 26 is shifted leftward (to a higher bit) in bit position by the bit position switching circuit 28, the multiplication of $2^n$ is carried out with the data X. Therefore, the octave is raised as much as the number n of the bit positions. On the other hand, when the output data qF of the accumulator 26 is shifted rightward (to a lower bit), the multiplication of $2^{-n}$ is carried out with the data X. Therefore, the octave is lowered as much as the number n of the bit positions.

Referring to FIG. 3, the note decoder 23 is made up of an AND circuit group 23A whose logic is so designed that the note codes $N_1$–$N_4$ as indicated in Table 1 are decoded separately according to the notes C# through C. The constant memory 24 comprises an OR circuit group 24A whose logic is so designed that 10-bit binary constant data F($F_1$ through $F_{10}$) having predetermined values are obtained according to the outputs of the decoder 23, and a gate section 24B which selects the outputs of the OR circuit group 24A according to the contents of the keyboard codes $K_1$, $k_2$.

As the bit position switching circuit 28 shown in FIG. 4 is so designed as to effect the leftward shifting operation (the multiplication of $2^n$), the constant data F proportional to the frequencies of twelve notes in the lowest octave range are stored in the constant memory 24. Although the true lowest octave range shown in Table 1 is the first octave range in which the content of the octave code $B_1$–$B_3$ is "000", only the note $C_2$ belongs to the first octave scale. Therefore, in the wave generator 10 in this example, the second octave range in which the content of the octave code $B_1$–$B_3$ is "001" is employed as the lowest octave range (or the fundamental octave), and the constant data F corresponding to the frequencies of twelve notes ($C_2$#, $D_2$ . . . $B_2$, $C_3$) in the second octave range are stored in the addresses of the constant data memory 24. In addition, the constant data F concerning the note $C_2$ which is only one note which belongs to the first octave range is especially stored. That is, logic is provided in the OR circuit group 24A so that, as indicated in Table 2, data having a value a half (½) of the note C ($C_3$) which belongs to the fundamental octave (or the second octave scale) is read out as the constant data F for the note $C_2$. In addition, in this example, data F slightly different in value separately according to the kinds of keyboards are stored in the memory 24; however, the data listed in Table 2 are for the lower keyboard only.

TABLE 2

| | | | Contents stored in the memory 24, for the lower keyboard | | | | | | | | | |
|---|---|---|---|---|---|---|---|---|---|---|---|---|
| | | Note to be | (MSB) | | | | Constant data F | | | | | (LSB) |
| | Note | used | $F_{10}$ | $F_9$ | $F_8$ | $F_7$ | $F_6$ | $F_5$ | $F_4$ | $F_3$ | $F_2$ | $F_1$ |
| The | $C_2$ | Only $C_2$ | 0 | 1 | 1 | 1 | 0 | 1 | 0 | 0 | 0 | 1 |
| Funda- | C# | Notes higher | 0 | 1 | 1 | 1 | 1 | 0 | 1 | 1 | 0 | 1 |
| men- | | than the | | | | | | | | | | |
| tal | D | second octave | 1 | 0 | 0 | 0 | 0 | 0 | 1 | 0 | 1 | 0 |
| oct- | | range, $C\#_2$–$C_2$ | | | | | | | | | | |
| ave | D# | | 1 | 0 | 0 | 0 | 1 | 0 | 1 | 0 | 0 | 1 |
| | E | | 1 | 0 | 0 | 1 | 0 | 0 | 1 | 0 | 1 | 0 |
| | F | | 1 | 0 | 0 | 1 | 1 | 0 | 1 | 1 | 0 | 1 |
| | F# | | 1 | 0 | 1 | 0 | 0 | 1 | 0 | 0 | 1 | 0 |
| | G | | 1 | 0 | 1 | 0 | 1 | 1 | 1 | 0 | 0 | 1 |
| | G# | | 1 | 0 | 1 | 1 | 1 | 0 | 0 | 0 | 1 | 0 |
| | A | | 1 | 1 | 0 | 0 | 0 | 0 | 1 | 1 | 1 | 0 |
| | A# | | 1 | 1 | 0 | 0 | 1 | 1 | 1 | 1 | 0 | 1 |
| | B | | 1 | 1 | 0 | 1 | 1 | 0 | 1 | 1 | 1 | 0 |
| | C | | 1 | 1 | 1 | 0 | 1 | 0 | 0 | 0 | 1 | 0 |

As the constant data F concerning the note $C_2$ is used for the note $C_2$ only, it is necessary for the note decoder 23 to determine whether the note code $N_1$–$N_4$ is for the note $C_2$ or a note other than the note $C_2$. Therefore, an AND circuit 29 for the note $C_2$ only is provided in the AND circuit group 23A. Data $B_1$ through $B_3$ obtained by inverting the data of the bits $B_1$ through $B_3$ of the octave code are applied to the AND circuit 29. When the octave code $B_1$–$B_3$ is for the first octave range, the data "000" is inverted into "111", as a result of which the AND circuit 29 is enabled. Accordingly, upon application of the note code $N_1$ through $N_4$ of the note $C_2$, in the first octave range, the output of the AND circuit 29 is raised to "1", the constant data F for the note $C_2$ only is read out of the memory 24.

As all the constant data F read out of the constant memory 24 are handled as those for the same octave range (the fundamental octave), it is necessary to convert the octave code $B_1$–$B_3$ representative of the first octave range corresponding to note $C_2$ into the data of the second octave. For this purpose, the octave code $B_1$–$B_3$ is applied to the NOR circuit 30 in FIG. 4, and a signal "1" produced by the NOR circuit 30 when the octave code is "000" is applied to the OR circuit 31 so as to change the data of the bit $B_1$ into "1". As a result, when the octave code $B_3$, $B_2$, $B_1$ is "000", it is converted into "001", and thereafter is applied to a 3-bit full adder 27A in the octave control circuit 27.

The output "1" of the NOR circuit 30 is applied through a line 32 to an inverter 34, where it is inverted, and is applied to the AND circuit 33 of the note decoder 23. The AND circuit 33 is a circuit for decoding the note codes $N_1$–$N_4$ of the notes C other than the note C ($C_2$) in the first octave scale. Upon application of the note code $N_1$–$N_4$ of the note $C_2$, the AND circuit 23 is made inoperable by the signal "1" supplied through the line 32.

In this example, the instrument is so designed that even with the same notes, constant data F slightly different in value are read out of the memory 24 according to the keyboards to which the note belongs. In FIG. 3, the keyboard code $K_1$, $K_2$ is decoded by a decoder 24C, and according to the content of the thus decoded keyboard code an upper keyboard signal UE, a lower keyboard signal LE or a pedal keyboard signal PE is produced. Constant data F concerning the same notes are, in a parallel mode and separately according to the keyboards, read out of the OR circuit group 24A according to the outputs of the note decoder 23. These constant data F are selected by the gate section 24B according to the aforementioned keyboard signals UE, LE and PE.

Figure 6:
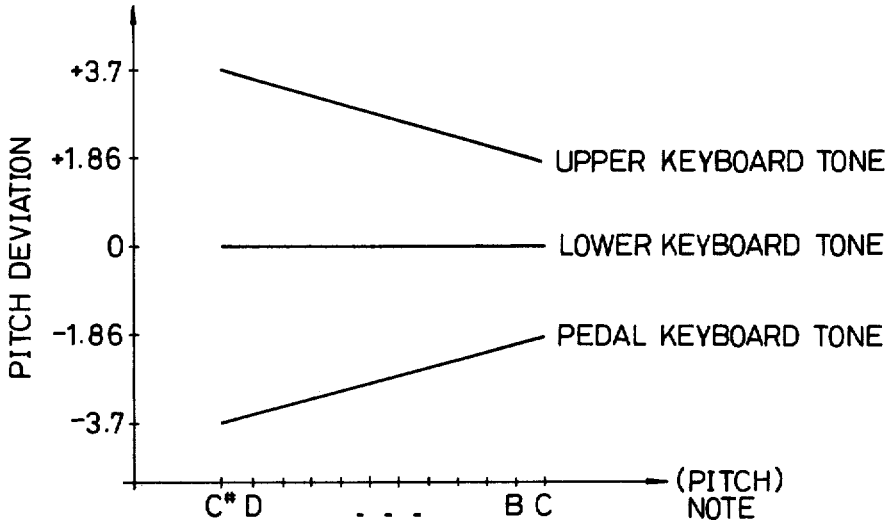
FIG. 6 is a graphical representation indicating the pitch deviations of the tones of different keyboards which may be caused by slightly differentiating the values of constant data F separately according to the keyboards.
Figure 6:
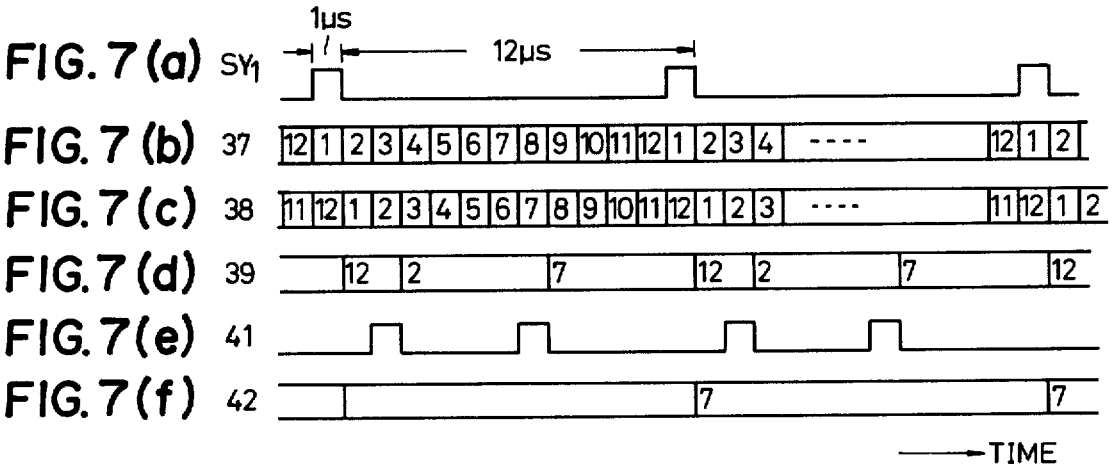

As is apparent from the input connection states of the OR circuit group 24A, the data of less significant bits than the bit $F_4$ are different according to the kinds of keyboards, but the data of more significant bits than the bit $F_5$ are equal regardless of the kinds of keyboards. Therefore, the difference between the constant data F for the different keyboards is very small. This very small difference gives a slight pitch deviation to the musical tone waveform signal produced by using the constant data F. In this example, the circuit is so designed that the constant data F concerning the notes C# through C of the lower keyboard set as indicated in Table 2 produced normal pitch music tone waveforms. Accordingly, the pitch deviation of the lower keyboard tone is zero (0) cent as indicated in FIG. 6: The constant data F corresponding to the notes of the upper keyboard are set to such values that musical tone waveforms having pitches somewhat higher than the normal pitches can be produced, and furthermore the pitch deviation of each note is not uniform; that is, as is shown in FIG. 6, the amount of pitch deviation is decreased from +3.7 cents to +1.86 cents as the tone pitch increases from the note C# to the note C. The constant data F corresponding to the notes of the pedal keyboard are set to such values that musical tone waveforms having somewhat lower than the normal pitches can be produced. Furthermore, as indicated in FIG. 6, the amount of pitch deviation is shifted from −3.7 cents to −1.86 cents as the tone pitch increases from the note C# to the note C.

The reason why the constant data are slightly different according to the kinds of keyboards is to prevent the occurrence of the case in which the phases of musical tone waveforms produced at the same time are opposite to one another whereby the tones produced are cancelled. In other words, it is frequently effected to depress two keys which belong to different keyboards but have the same tone pitch. If in this case the tones of the two keys are produced at the completely same frequency and the phases of the two tones are opposite to each other, the tones are cancelled by one another. However, the constant data F are made slightly different in vlaue from one another, in this example. Therefore, even if keys having the same tone pitch in different keyboards are depressed at the same time, the phase of the tones of the keys will not become completely opposite to one another, that is, the tones will not be cancelled.

The bit data $F_1$ through $F_{10}$ of the constant data F are selected through the AND circuits enabled with the aid of the keyboard signals UE, LE and PE in the gate section 24B, and are collected by the OR circuits separately according to the bits. As the key codes $N_1$-$N_4$, $B_1 \propto B_3$, $K_1$, $K_2$ are supplied in time-sharing manner separately according to the channel as was described before, the constant data F ($F_1$-$F_{10}$) corresponding to the notes assigned to the channels are read out of the constant memory 24 in time-sharing manner.

The constant data F read out are applied to the accumulator 26 in FIG. 4. The accumulator 26 comprises a 21-bits adder group 26A and a 21-bits, 12-stages shift register group 26B. The outputs of the adder group 26A are applied through an AND circuit group 26C to the shift register group 26B where they are delayed by 12 channel times. The bit outputs $Q_1$ through $Q_{21}$ (qF) of the shift register group 26B are applied to the bit position switching circuit 28 and are fed back to the adder group 26A where the constant data $F_1$ through $F_{10}$ (F) are subjected to addition. Accordingly, it is possible to accumulate the constant data F in time-sharing manner separately according to the channels, and the addition of the constant data F concerning one channel is repeatedly effected every twelve channel times (12 microseconds). The adders for ten lower significant bits in the adder group 26A are full-adders, and the bit data $F_1$ through $F_{10}$ of the constant data are applied, as addition inputs, to the full-adders for the ten less significant bits. The adders for eleven higher significant bits in the adder group 26A are half-adders. In these half-adders, a carry signal applied from the carry output of a less significant bit adder to the carry input is added to the data fed back from the corresponding bit position of the shift register group 26B. The AND circuit group 26C is made inoperable by the clear signal CC supplied by the tone production assigning circuit 13, thereby to clear the count result of the accumulator 26.

The bit position switching circuit 28 comprises an OR circuit group 28A consisting of fifteen 8-input type OR circuits for introducing the bits $S_1$ through $S_{15}$ of the variable data XqF subjected to octave switching, and an AND circuit group 28B consisting of 120 2-input type AND circuits, eight AND circuits being provided for each of the OR circuits of the OR circuit group 28A. The AND circuits, eight AND circuits being provided for each of the bits $S_1$ through $S_{15}$, in the AND circuit group 28B are enabled independently by the signals supplied through eight output lines of the decoder 27B in the octave control circuit 27. The outputs $Q_1$ through $Q_{21}$ of the accumulator 26 are applied to the AND circuit group 28B in such a manner that these outputs are distributed to the respective bit $S_1$ through $S_{15}$ in correspondence to the eight outputs $X_2$, $X_3$ . . . $X_0$ and $X_1$ of the decoder 27B. The bit positions of the bits $Q_1$ through $Q_{21}$ of the variable data qF are switched according to the outputs $X_2$-$X_1$ of the decoder 27B, whereby the variable data XqF ($S_1$ through $S_{15}$) are obtained. This is as listed in Table 3.

TABLE 3

| | (MSB) | | | | | | XgF | | | | | | | | (LSB) |
|---|---|---|---|---|---|---|---|---|---|---|---|---|---|---|---|
| X | $S_{15}$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ |
| $X_2$ | $Q_{21}$ | $Q_{20}$ | $Q_{19}$ | $Q_{18}$ | $Q_{17}$ | $Q_{16}$ | $Q_{15}$ | $Q_{14}$ | $Q_{13}$ | $Q_{12}$ | $Q_{11}$ | $Q_{10}$ | $Q_9$ | $Q_8$ | $Q_7$ |
| $X_3$ | $Q_{20}$ | $Q_{19}$ | $Q_{18}$ | $Q_{17}$ | $Q_{16}$ | $Q_{15}$ | $Q_{14}$ | $Q_{13}$ | $Q_{12}$ | $Q_{11}$ | $Q_{10}$ | $Q_9$ | $Q_8$ | $Q_7$ | $Q_6$ |
| $X_4$ | $Q_{19}$ | $Q_{18}$ | $Q_{17}$ | | | | — | | | | | | $Q_7$ | $Q_6$ | $Q_5$ |
| $X_5$ | $Q_{18}$ | $Q_{17}$ | | | | | — | | | | | $Q_7$ | $Q_6$ | $Q_5$ | $Q_4$ |
| $X_6$ | $Q_{17}$ | $Q_{16}$ | | | | | — | | | | $Q_7$ | $Q_6$ | $Q_5$ | $Q_4$ | $Q_3$ |
| $X_7$ | $Q_{16}$ | $Q_{15}$ | | | | | — | | | $Q_7$ | — | | $Q_4$ | $Q_3$ | $Q_2$ |
| $X_0$ | $Q_{15}$ | $Q_{14}$ | | | | | — | | $Q_7$ | | — | | $Q_3$ | $Q_2$ | $Q_1$ |
| $X_1$ | $Q_{14}$ | $Q_{13}$ | | | | | — | $Q_7$ | | | — | | $Q_2$ | $Q_1$ | — |

The output data $X_2$, $X_3$, $X_4$ . . . $X_0$, and $X_1$ correspond to the values of the octave switching data X. More specifically, the data $X_2$ is for the lowest octave (or the second octave range in Table 2), the octave range is raised successively, or octave by octave, in the order of the data $X_3$, $X_4$, $X_5$, $X_6$ and $X_7$, and the data $X_1$ specifies the highest octave range. Accordingly, if it is assumed that the state where the bits $Q_7$ through $Q_{21}$ of the variable qF are led into the bits $S_1$ through $S_{15}$ of the variable XqF is a shift amount zero (or a bit position switching amount zero), 1-bit, 2-bit, . . . 6-bit or 7 bit leftward shifting operation is effected respectively by the data $X_3$, $X_4$ . . . $X_0$ or $X_1$. This means that the variable data XqF which is 2 times, 4 times, . . . $2^6$ times or $2^7$ times the value of the data qF is provided.

In the octave control circuit 27, a 2-bit adder 27A operates to add the feet change data $FF_3$, $FF_2$ and $FF_1$ to the octave code $B_3$, $B_2$ and $B_1$ thereby to change the octave range. The relationships between the contents of the feet change data $FF_3$, $FF_2$ and $FF_1$ and the amount of octave change are as indicated in Table 4. The feet change data $FF_3$-$FF_1$ are automatically supplied by a device (not shown) when the octave of a note to be produced is changed.

TABLE 4

| Amount of octave change | $FF_3$ | $FF_2$ | $FF_1$ |
|---|---|---|---|
| No change | 0 | 0 | 1 |
| 1 octave up | 0 | 1 | 0 |
| 2 octave up | 0 | 1 | 1 |
| 3 octave up | 1 | 0 | 0 |

The contents of the octave code $B_3$, $B_2$, $B_1$ inputted to the adder 27A are as indicated in Table 1; however, the contents are in the range of from "001" to "101" because the code "000" in the first octave range is changed into "001". Therefore, the octave data $B_3$*, $B_2$*, $B_1$* outputted by the adder 27A is "010" (two in decimal notation) for the lowest octave as a result of the following calculation: $B_3$, $B_2$, $B_1+FF_3$, $FF_2$, $FF_1$="001"+"001". Furthermore, the octave data $B_3$*, $B_2$*, $B_1$* for the highest octave is "001" (one in decimal notation) as a result of the following calculation: $B_3$, $B_2$, $B_1+FF_3$, $FF_2$, $FF_1$+"101"+"100". Accordingly, the decimal value of the octave data $B_3$*, $B_2$*, $B_1$* will be 2, 3, 4, 6, 7, 0, 1 as the octave range is raised. The decoder 27B operates to decode the octave data $B_3$*, $B_2$*, $B_1$*, according to the decimal value thereof, into the output data $X_2$, $X_3$, $X_4$, . . . $X_0$, $X_1$. Accordingly, the data $X_2$ obtained by decoding the decimal value "2" corresponds to the lowest octave, while the data $X_1$ obtained by the decimal value "1" corresponds to the highest octave. A 12-stage 3-bit shift register 27C provided between the adder 27A and the decoder 27B operates to establish synchronization with the delay time of twelve channel times in the accumulator 26.

In the variable data outputted by the bit position switching circuit 28, the data of the bits $S_1$ through $S_{11}$ are applied to the waveform memory 15A for 2 foot (2') register, the data of the bits $S_2$ through $S_{12}$, to the waveform memory 15B for 4 foot (4') register, the data of the bits $S_3$ through $S_{13}$, to the waveform memory 15C for 8 foot (8') register, the data of the bits $S_4$ through $S_{14}$, to the waveform memory 15D for 16 foot (16') register, and the data of the bits $S_5$ through $S_{15}$, to the waveform memory 15E for 32 foot (32') register. Therefore, the data in which the bit position of the variable data XqF has been substantially shifted are applied to the waveform memories 15A through 15E, and the periods of time required for reading out the tone source waveforms over the respective unitary periods, which are stored in the memories 15A through 15E, are different by the power of 2. Therefore, it is possible to simultaneously read the tone source waveforms for two foot through thirty-two foot registers whose frequencies are different by the octave. It goes without saying that the number of addresses are equal in the waveform memories 15A through 15E, and therefore memories having the same construction may be employed for these memories.

The key voltage generating circuit 25 is provided to generate a key voltage (tone pitch voltage) KV for controlling according to the pitch of a tone to be produced the cut-off frequency of the voltage control type filter 19 for tone color control. As is well known in the art, in order that the relation of the harmonic components of a produced tone is maintained constant regardless of its tone pitch (the fundamental frequency) thereby to obtain a constant tone color, it is necessary to vary the cut-off frequency of the voltage control type filter according to the pitch of the tone produced. In the electronic musical instrument shown in FIG. 1, the tone source waveforms of plural tones produced in the channels are multiplexed, and are applied through the line 17 to one voltage control type filter 19. Therefore, it is necessary to apply the key voltage KV to the voltage control type filter 19, which is representative of one of the plural tones. In this example, the key voltage KV is provided according to a high-tone priority; however, it is unnecessary to provide priority order for all of the keys; that is, the aimed object can be achieved by dividing the keys into several scales and by employing a key voltage KV corresponding to the relevant range.

For this purpose, the key voltage generating circuit 25 is so designed as to generate a key voltage KV for every half octave, whereby the priority order is determined every half octave. Thus, the octave code $B_1$-$B_3$ and the most significant bit data $N_4$ of the note code are applied to the key voltage generating circuit 25. As is apparent from Table 1, the value of the bit $N_4$ is "0" in the first half (C#-F#) of one octave and is "1" in the second half (G-C). Therefore, distinction of the half octave range can be achieved by the use of 4-bit data $B_3$, $B_2$, $B_1$, $N_4$. As the octave is raised, the value of the data $B_3$, $B_2$, $B_1$, $N_4$ is increased. Therefore, the determination of high-tone priority is effected by detecting a channel in which the value of the data $B_3$, $B_2$, $B_1$, $N_4$ is maximal, by the use of a comparator 35 and a primary memory 39.

In the distribution circuit 16 in FIG. 1, only the upper keyboard tones are distributed through the line 17 to the voltage control type filter 19. Therefore, the AND circuit group 36 of the key voltage generating circuit 25 is enabled by the upper keyboard signal UE, so that the data $B_3$, $B_2$, $B_1$, $N_4$ concerning the upper keyboard tones are selected by the AND circuit group 36. After being synchronized by the delay flip-flop group 37, the data $B_3$, $B_2$, $B_1$, $N_4$ is applied to the input A of the comparator 35.

The primary memory 39 comprises a gate section and a delay flip-flop group. When a clock pulse signal $SY_1$, 1 microsecond in pulse width (one channel times) and twelve microseconds in period (twelve channel times) as shown in the part (a) of FIG. 7 is applied through the OR circuit 40 to the gate section, the data from the delay flip-flop group 38 are stored in the primary memory 39. The data thus stored in the primary memory 39 are applied to the input B of the comparator 35. The comparator 35 compares the input A with the input B, and produces an output "1" when A=B. This output "1" of the comparator 35 is applied through a flip-flop 41 and an OR circuit 40 to the gate section of the primary memory 39 thereby to cause the data from the delay flip-flop group 38 to be stored in the primary memory 39.

For instance, if the channel time of the data $B_3$, $B_2$, $B_1$, $N_4$ outputted by the delay flip-flop group 37 is as shown in the part (b) of FIG. 7, the channel time of the output data of the delay flip-flop group 38 is delayed by one microseconds as shown in the part (c) of FIG. 7. Upon production of the clock pulse $SY_1$, the content in the primary memory 39 is cleared, and the output (the data $B_3$-$N_4$ of the twelfth channel in the example shown) of the delay flip-flop 38 is newly stored in the primary memory 39. This storage is self-held until the next clock pulse $SY_1$ is produced, unless an output "1" is produced by the comparator 35. In other words, the content stored in the primary memory 39 is repeatedly cleared with the timing of the clock pulse $SY_1$.

The data $B_3$–$N_4$ of the channels applied to the input A of the comparator 35 from the delay flip-flop 37 are compared with the data stored in the primary memory 39 every channel time, and the content stored in the primary memory 39 is rewritten into a larger value according to the output "1" of the comparator. For instance, in the case where the value of the data of the twelfth channel stored firstly in the primary memory 39 is smaller than the value of the data of the second channel, the output "1" is provided by the delay flip-flop 41 as shown in the part (e) of the FIG. 7, and the data of the second channel is stored in the primary memory 39, and is outputted by the primary memory 39 in one microsecond as shown in the part (d). Furthermore, when the data of the seventh channel is larger than the data of the second channel, an output "1" is provided by the delay flip-flop 41 in coincidence with the data output timing of the seventh channel of the delay flip-flop group 38, and the data of the seventh channel is stored in the primary memory 39.

Thus, before the clock pulse $SY_1$ is next produced, that is, during the twelve channel times, the data of all the channels are compared with one another, as a result of which when the clock pulse $SY_1$ is produced, the data stored in the primary memory 39 is the maximum value.

A secondary memory 42 comprises a gate section for selecting the maximum value data stored in the primary memory 39 with the production timing of the clock pulse $SY_1$, and a delay flip-flop group for storing this maximum value data, and operates to self-hold this maximum value data for one period of the clock pulse $SY_1$ (cf. the part (f) of FIG. 7).

Accordingly, the data $B_3$–$N_4$ for the half octave range to which the highest tone out of the tones of the depressed keys selected in the high-tone priority system by the comparison in time-sharing manner using the comparator 35 and the primary memory 39 belong is converted into direct current by the secondary memory 42, so as to be the data representative of all the channels.

The data $B_3$–$N_4$ stored in the secondary memory 42 is decoded separately according to the half-octave ranges in a decoder 43, and an analog voltage (key voltage KV) corresponding to the decoded range is read out of a key voltage memory 44. In this example, the data $B_3$–$N_4$ for the half-octave scale can have eleven different values ranging from the second half "0001" ("1" in decimal notation) of the first octave range to which only the note $C_2$ belongs to the second half "1011" ("11" in decimal notation) of the sixth octave scale. However, as the note of the lowest range "0001" is only one note, or the note $C_2$, a key voltage KV having the same value as that of the key voltage KV of the range (the front half of the second octave range) higher than the lowest range is read out of the memory 44. Accordingly, the decoding outputs "1" and "2" of the contents "0001" and "0010" and "0010" of the data $B_3$–$N_4$ serves to read key voltages KV having the same zero volt out of the memory 44. This memory 44 is so designed that as the range is raised, the higher key voltage KV is read out.

In the case where a voltage control type filter 19 such as shown in FIG. 1 is not employed in an electronic musical instrument, it is unnecessary to provide the key voltage generating circuit 25 in the wave generator 10.

The wave generator 10 can be extensively employed not only to an electronic musical instrument such as shown in FIG. 1, but also to a device in which the sequential sample point amplitudes of a waveform stored in a waveform memory are repeatedly read to obtain a waveform signal having a desired frequency.

In the above-described example, only the constant data F corresponding to the notes (twelve notes) in one octave are stored, as those corresponding to the frequency, in the memory; however, it should be understood that the invention is not limited thereto or thereby. For instance, the constant data F corresponding to the notes in two octaves may be stored in the memory.

As is apparent from the above description, according to the invention, only the constant data F corresponding to the notes in a desired octave are stored, as those corresponding to the frequency, is stored in the memory. Therefore, the amount of storage in the memory is much less than the number of all the keys of the electronic musical instrument.

What is claimed is:

1. A [note] *tone* wave generator in a keyboard electronic musical instrument, which comprises:

memory means for storing constants corresponding to musical tone frequencies included in one out of a plurality of groups into which keys of said keyboard are divided separately on the octave basis;

accummulator means for repeatedly adding said constants read out of said memory means in response to depression of a selected key, said accumulator means providing the resultant accummulated data in parallel binary format; and bit position switching means for shifting said parallel binary format data provided by said accumulator means by a number of bit positions corresponding to the octave range designated by said selected key so as to obtain data which varies repeatedly according to the frequency of the tone to be produced.

2. A [note] *tone* wave generator as claimed in claim 1, in which said memory means is also capable of storing constants corresponding to notes which belong to a group whose range is short of one octave in said group division.

3. An electronic musical instrument of the type having a tone generator that generates musical tones having a frequency established by an input constant to which said frequency is proportional, the improvement wherein said instrument includes:

a plurality of like waveform memories, each storing sampled amplitudes of a musical waveform, memory means for storing constant data for each pitch within a certain octave and for providing as an output in binary format the constant data for a selected note, accumulator means, connected to said memory means, for repetitively adding said constant data so as to provide accumulated constant data, octave selection means for providing a signal indicative of the desired octave of note production, bit position switching means, receiving said accumulated constant data from said accmumulator means and responsive to said signal indicative of the desired octave of note production, for shifting said accumulated constant data by a number of binary positions corresponding to the number of octaves separating said desired octave from said certain octave, the resultant accumulated and shifted constant data being supplied as said input constant, and memory access means, connected to said bit position switching means, for accessing amplitude samples from said waveform memories in response to said accumulated and shifted constant data, different ones of said plurality of waveform memories being accessed simultaneously by accumulated constant data shifted by different numbers of bit positions.

4. An electronic musical instrument of the type having a tone generator that generates musical tones having a frequency established by an input constant to which said frequency is proportional, the improvement wherein said instrument includes:

memory means for storing constant data for each pitch within a certain octave and for providing as an output in binary format the constant data for a selected note, octave selection means for providing a signal indicative of the desired octave of note production, bit position switching means, receiving such output constant data and responsive to said signal indicative of the desired octave of note production, for shifting said constant data by a number of binary positions corresponding to the number of octaves separating said desired octave from said certain octave, the resultant shifted constant data being supplied to said tone generator for use thereby as said input constant to establish the frequency of said generated musical tone, and accumulator means, connected between said memory means and said bit position switching means, for repetitively adding said output constant data to provide accumulated output constant data, said bit position switching means receiving and shifting said accumulated output constant data by said corresponding number of binary positions and also by other numbers of binary positions so as to provide a plurality of outputs shifted by different numbers of binary positions, said tone generator comprising:

a plurality of like waveform memories each storing sampled amplitudes of a musical waveform, and memory access means for simultaneously accessing sampled amplitudes from said plural waveform memories in response to respective ones of said differently shifted plurality of outputs.

5. An electronic musical instrument according to claim 4 wherein said bit position switching means provides said accumulated shifted constant data as a multi-bit parallel binary output having more bits than required by said memory access means to access one of said waveform memories, said pluraity of outputs consisting of different subsets of said bits.

6. In an electronic musical instrument, a tone generator comprising:

a plurality of like waveform memories each storing amplitude samples of a like musical waveform at an equal number of memory addresses, a source of constant data proportional to the desired frequency of a tone to be produced by said tone generator, accumulator means for accumulating said constant data at a fixed clock rate, and for providing said accumulated constant data in parallel binary format, and access means for simultaneously accessing said amplitude samples from different ones of said waveform memories at each individual access time in response to respective different access addresses, each access address consisting of a different subset of said parallel binary accumulated constant data, the resultant amplitude samples accessed from different individual memories representing said like musical waveform in correspondingly different octaves.

7. In an electronic musical instrument, a tone generator comprising:

a plurality of like waveform memories each storing amplitude samples of a like musical waveform at an equal number of memory addresses, a source of constant data proportional to the desired frequency of a tone to be produced by said tone generator, accumulator means for accumulating said constant data at a fixed clock rate, and for providing said accumulated constant data in parallel binary format, and access means for accessing said amplitude samples from individual ones of said waveform memories simultaneously in response to different subsets of said parallel binary accumulated constant data, the resultant amplitude samples accessed from different individual memories representing said like musical waveform in correspondingly different octaves, and wherein:

said source of constant data comprises pitch constant data storage means for storing a constant data value for each pitch name in a fundamental octave, said accumulator means including a repetitive addition circuit receiving a selected one of said constant data values and repetitively adding said selected value to the prior contents of said addition circuit at said fixed clock rate to obtain said accumulated constant data, said instrument further comprising:

a bit position shifting circuit for shifting said accumulated constant data from said addition circuit by a number of bit positions corresponding to the difference between said fundamental octave and the desired octave of tone production, the number of bits in the resultant shifted accumulated constant data being more than required to access the addresses of any of said waveform memories, said access means using different subsets of said resultant shifted accumulated constant data from said shifting circuit to access respective ones of said waveform memories, said subsets being sequentially ordered with most significant bit positions differing from each other successively by one bit position, whereby the waveforms accessed from said plural memories will be octavely related.

8. An electronic musical instrument according to claim 7 wherein said musical instrument includes plural keyboards and wherein said pitch constant data storage means stores a corresponding plurality of sets of slightly different constant data values for each pitch name in a fundamental octave, the playing of a certain key in a certain keyboard causing said storage means to provide to said accumulator means the selected constant data value for the pitch name of the played key, said value being supplied from the set corresponding to the keyboard containing said played key, said slightly different constant data values in said sets thereby resulting in slightly different tone pitches being produced when the same pitch name keys are selected on two different keyboards.

9. In an electronic musical instrument, a tone generator comprising:

a plurality of like waveform memories each storing amplitude samples of a like musical waveform at an equal number of memory addresses, a source of constant data proportional to the desired frequency of a tone to be produced by said tone generator, accumulator means for accumulating said constant data at a fixed clock rate, and for providing said accumulated constant data in parallel binary format, access means for accessing said amplitude samples from individual ones of said waveform memories simultaneously in response to different subsets of said parallel binary accumulated constant data, the resultant amplitude samples accessed from different individual memories representing said like musical waveform in correspondingly different octaves, and wherein said tone generator is time shared so as to generate concurrently a plurality of tones in time shared fashion, said tone generator including:

a voltage controlled filter connected to filter the musical waveforms from said waveform memories together with:

highest pitch detection means for ascertaining the maximum pitch of any note being generated concurrently by said tone generator, and key voltage generator means for providing a control voltage to said voltage controlled filter established by said ascertained maximum pitch, and wherein said instrument utilizes key codes including a pitch name portion and an octave portion, said pitch name portion being used to control said source of constant data, said octave portion being supplied to said highest pitch detection means for use thereby in ascertaining said maximum pitch.

10. A [note] *tone* wave generator in an electronic musical instrument, which comprises:

a keyboard including playing keys, key code generating means for producing a key code which includes a note data portion and octave data portion thereby identifying [the] *a* key operated in the keyboard, memory means for storing constants each in a binary representation consisting of a plurality of bits corresponding to musical tone frequencies to be generated in correspondence to notes included in a desired one out of a plurality of groups into which keys of a keyboard are divided separately on the octave basis, readout means for reading out a constant from said memory means according to the note data portion of said key code, accumulator means for adding said constants read out of said memory means repeatedly thereby producing accumulated values which increase progressively, bit position switching means for shifting the bit position of data obtained by said accumulator means according to the octave data portion of said key code, and tone wave generating means which generates a tone wave signal in response to said accumulated values.

*11. A tone wave generator in an electronic musical instrument, which comprises:*

*a keyboard including playing keys,*

*key code generating means for producing a key code which includes a note data portion and an octave data portion thereby identifying a key operated in the keyboard,*

*constant memory means for storing constants corresponding to musical tone frequencies to be generated in correspondence to notes included in one out of a plurality of groups into which keys of a keyboard are divided separately on the octave basis,*

*readout means for reading out a constant from said constant memory means according to the note data portion of said key code,*

*operation means responsive to the constant read out from said constant memory means and to the octave portion of said key code for producing an address signal which varies progressively at a rate according to both the note data portion and octave data portion of said key code, and* waveform memory means for storing waveform information in each address thereof and being accessed by said address signal thereby producing a tone wave signal corresponding to said key code.

*12. A tone wave generator according to claim 11 further comprising means for producing additional data to modify said address signal with respect to octave information wherein said operation means receives said additional data to produce the access signal in accordance with the combination of said key code and said additional data.*

*13. A tone wave generator according to claim 11 wherein said constant memory means stores said constants in binary format and wherein said operation means includes circuitry for shifting said read out binary constant by an amount established by said octave data portion.*

*14. A tone wave generator in an electronic musical instrument, which comprises:*

*a keyboard including playing keys,*

*key code generating means for producing a key code which includes a note data portion and an octave data portion thereby identifying a key operated in the keyboard,*

*constant memory means for storing constants corresponding to musical tone frequencies to be generated in correspondence to notes included in one out of a plurality of groups into which keys of a keyboard are divided separately on the octave basis,*

*first operation means, responsive to the note data portion of said key code, for accessing said constant memory means to produce a first signal designating a note corresponding to said operated key,*

*second operation means responsive to the octave data portion of said key code for modifying said first signal in accordance with said octave data portion thereby producing a second signal designating the note and octave both corresponding to said operated key, and*

*waveform memory means for storing waveform information in each address thereof and being accessed in accordance with said second signal thereby producing a tone wave signal corresponding to said key code.*

*15. A tone wave generator according to claim 14 further comprising means for producing additional data to modify said second signal with respect to octave information, and wherein said second operation means receives said additional data to produce the second signal in combination with said key code and said additional data.*

*16. A note wave generator in an electronic musical instrument, which comprises:*

*a keyboard including playing keys,*

*key code generating means for producing a key code which includes a note data portion and an octave data portion thereby identifying the key operated in the keyboard,*

*memory means for storing constants each in a binary representation consisting of a plurality of bits corresponding to musical tone frequencies to be generated in correspondence to notes included in a desired one out of a plurality of groups into which keys of a keyboard are divided separately on the octave basis,*

*readout means for reading out a constant from said memory means according to the note data portion of said key code,*

*bit position switching means for shifting the bit position of said constant read out from said memory means according to the octave data portion of said key code,*

*accumulated value means for repetitively utilizing said bit position shifted constant to produce accumulated values which increase progressively, and*

*tone wave generating means which generates a tone wave signal in response to said accumulated values.*

*17. A note wave generator according to claim 16 wherein said tone wave generating means includes at least one waveshape memory, and wherein said accumulated values constitute addresses for accessing said waveshape memory to read out the corresponding waveshape information stored therein, the addresses increasing in value progressively at a rate established by the value of said bit position shifted constant so that said stored waveshape information will be read out at a rate corresponding to said key code.*

*18. In a time shared keyboard electronic musical instrument of the type in which selected keys are represented by multibit parallel key codes, each key code including a note code portion specifying the particular note name of a musical octave, and an octave code portion specifying the particular octave of said selected key, said instrument having assignment means for assigning the key codes for selected keys to respective time slots in a set of such time slots and for delivering said set of assigned key codes repetitively to a common tone generator, the improvement wherein said tone generator comprises:*

*a frequency constant memory storing twelve values of frequency data, each associated with a respective note of the musical scale and each consisting of a multibit binary value,*

*note decoder readout means, connected to said assignment means to receive the note code portion of each delivered key codes, for reading out from said constant memory, each time that a note code portion is received, the frequency data value associated with the note specified by that received note code portion,*

*octave decoder switching control means, connected to said assignment means to receive the octave code portion of each delivered key code, for decoding said received octave code portion and for supplying octave switching data corresponding thereto,*

*variable data accumulation means, connected to said constant memory and to said octave decoder switching control means, for repetitively utilizing during corresponding repetitive time slots the read out frequency data values and the supplied octave switching data to produce accumulated variable data which changes in value progressively in correspondence to the frequency of a musical note having the note name associated with said frequency data value in an octave established by said octave switching data,*

*a waveshape memory storing data for establishing sequential sample point amplitudes of a musical tone source waveform, and*

*waveshape memory readout means, connected to said variable data accumulation means and to said waveshape memory, for reading out said stored waveform establishing data utilizing said accumulated variable data as the waveshape memory access address code.*

*19. An access signal generator for use in an electronic musical instrument of the type comprising tone wave memory means storing musical tone forming data and being accessed in accordance with an operated key among a plurality of keys in a keyboard, said generator comprising:*

*key code generating means for producing a key code which includes a note data portion and an octave data portion thereby identifying said operated key,*

*constant memory means for storing constants corresponding to musical tone frequencies to be generated in correspondence to notes included in one out of a plurality of groups into which said keys of the keyboard are divided separately on the octave basis,*

*readout means for reading said constant memory means to produce a constant information according to the note data portion of said key code,*

*modifying means responsive to the octave data portion of said key code for modifying said constant information in accordance with said octave data thereby producing a modified constant information corresponding to the note and octave portions of said key code; and*

*operation means responsive to said modified constant information for performing repetitive arithmetic operations on the modified constant information to produce an access signal which varies at a rate established by said key code, said tone wave memory means being accessed by said access signal.*

*20. An access generator according to claim 19 in which the constant information produced through said readout means by reading out said constant memory means is provided in binary format and in which said modifying means comprises bit position shifting means responsive to the octave data portion of said key code for shifting said constant information by a number of binary positions corresponding to a number of octaves designated by said octave data portion.*

* * * * *